United States Patent [19]

Inoue et al.

[11] Patent Number: 4,517,944
[45] Date of Patent: May 21, 1985

[54] IGNITION TIMING CONTROL FOR INTERNAL COMBUSTION ENGINES

[75] Inventors: Shingo Inoue, Anjo; Toshiharu Iwata, Aichi; Yasuhito Takasu, Toyohashi, all of Japan

[73] Assignee: Nippondenso Co., Ltd., Kariya, Japan

[21] Appl. No.: 396,363

[22] Filed: Jul. 8, 1982

[30] Foreign Application Priority Data

Jul. 9, 1981 [JP] Japan .............................. 56-106205

[51] Int. Cl.$^3$ .............................................. F02P 5/04
[52] U.S. Cl. .................................... 123/425; 123/417
[58] Field of Search ............... 123/425, 419, 435, 436, 123/416, 417, 415; 364/431.08

[56] References Cited

U.S. PATENT DOCUMENTS

| 4,026,251 | 5/1977 | Schweitzer et al. | 123/419 |
| 4,266,518 | 5/1981 | Nishida et al. | 123/416 |
| 4,367,531 | 1/1983 | Furuhashi et al. | 123/425 |

Primary Examiner—Andrew M. Dolinar
Attorney, Agent, or Firm—Cushman, Darby & Cushman

[57] ABSTRACT

A method for controlling the ignition timing of internal combustion engines by reducing the amount of correction of ignition timing with each change of direction of the correction. This increases the speed of approach to the approximate optimum ignition timing yet minimizes variation of ignition timing near the optimum state.

12 Claims, 11 Drawing Figures

| Fig. 4A |
| Fig. 4B |

IGNITION TIMING CONTROL FOR INTERNAL COMBUSTION ENGINES

BACKGROUND OF THE INVENTION

1. Field of the Invention

The present invention relates to a method and an apparatus for controlling the ignition timing of internal combustion engines. The method and apparatus of the present invention are used for internal combustion engines of automotive vehicles.

2. Description of the Prior Art

In general, the ignition timing of internal combustion engines is determined based on engine running conditions, such as speed, the intake vacuum, intake air flow, and engine temperature, so as to maximize engine output power and minimize fuel consumption without causing knock. The optimal ignition timing, however, cannot easily be maintained because it varies in accordance with individual engine differences and engine ambient conditions.

A prior art method has been proposed in which knock is sensed by a device which detects engine vibration at the detonation stroke. In this method, the ignition timing is retarded to a predetermined period upon knock and is advanced by a predetermined rate otherwise. This works to suppress knock below a predetermined level.

This prior art method, however, has a problem. When correcting the ignition timing by a predetermined rate, large amounts of correction cause large variations in ignition timing near the optimum state, though also resulting in a fast speed of approach to the approximate optimum state. This results in large variation of engine torque and, hence, reduced engine drivability. Contrary to this, small amounts of correction result in a low speed of approach to the approximate optimum state, though also causing less variations in ignition timing near the optimum state. This results in continued failure to meet the optimum ignition timing, hence, confined loss of output power.

SUMMARY OF THE INVENTION

It is the primary objec of the present invention to provide an improved method for controlling the ignition timing of internal combustion engines in which the speed of approach to the approximate optimum state is high and yet variation of ignition timing near the optimum state is minimized, so that the control of the ignition timing of internal combustion engines is carried out satisfactorily.

In accordance with the fundamental aspect of the present invention, there is provided a method for controlling the ignition timing for an internal combustion engines comprising the steps of: detecting the engine running condition and generating the detected signal, obtaining an amount of correction of the ignition timing for correcting the ignition timing, and correcting the ignition timing in the advance or retardation correction direction, said amount of correction of the ignition timing being reduced with each change in the direction of correction of the ignition timing.

DETAILED DESCRIPTION OF THE PREFERRED EMBODIMENT

Figure 1:
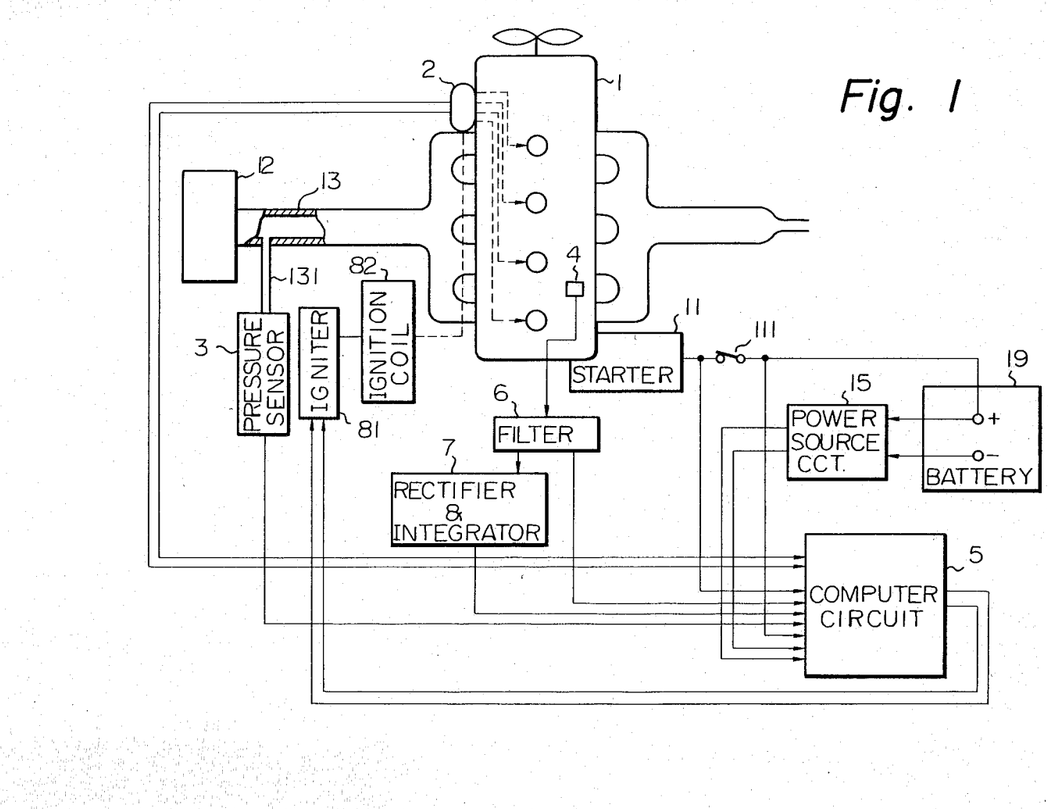
FIG. 1 illustrates an apparatus for controlling the ignition timing of internal combustion engines in accordance with an embodiment of the present invention.

The apparatus of FIG. 1 comprises four-cylinder four-cycle internal combustion engine 1, starter 11, starter switch 111, fuel supplying device 12, air intake manifold 13, pressure sensor 3, branch duct 131 for pressure sensor 3, and rotation sensor 2. Rotation sensor 2 is arranged in the ignition distributor for engine 1. Rotation sensor 2 produces a top dead center signal when the engine takes the top dead center position and produces a rotation angle signal when the engine has rotated by a predetermined crank angle, for example, 30°CA from the top dead center position. This predetermined angle is obtained by equally dividing one rotation of the engine.

The apparatus of FIG. 1 also comprises knock sensor 4, band pass filter 6, half wave rectifier and integrator circuit 7, computer 5, power source circuit 15, battery 19, igniter 81, and ignition coil 82.

Figure 2:
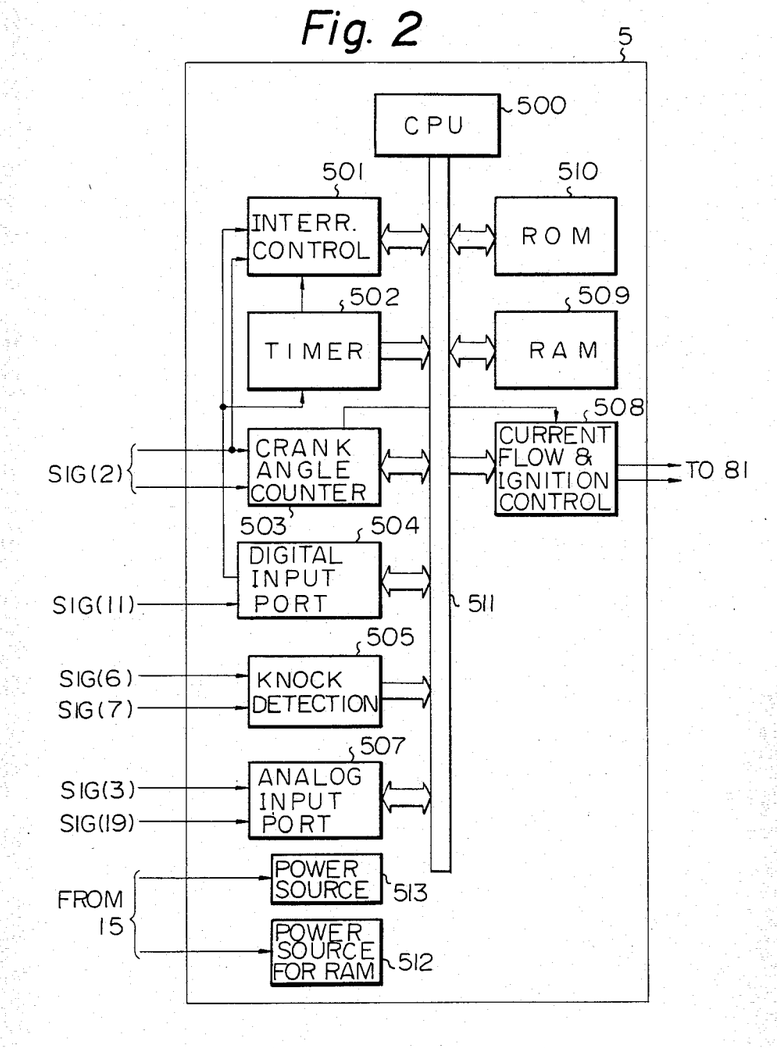
FIG. 2 illustrates the computer in the apparatus of FIG. 1.

As illustrated in FIG. 2, computer 5 comprises an 8 bit central processor unit (CPU) 500, interruption control unit 501, timer unit 502, crank angle counter unit 503, digital input port 504, knock detection circuit 505, analog input port 507, current-flow and ignition control unit 508, random access memory (RAM) 509, read only memory (ROM) 510, common bus 511, RAM power source circuit 512, and power source circuit 513.

Interruption control unit 501 receives the top dead center signal from rotation sensor 2, a program interruption signal from digital input port 504, and the signal from timer unit 502 for control of the interruption operation. Timer unit 502 comprises a 16-bit counter for counting the clock pulses which occur every 8 μs and a latch for storing the count each time rotation sensor 2 generates a predetermined signal. Crank angle counter unit 503 receives the top dead center signal and rotation angle SIG.(2) from rotation sensor 2 and gives the count which represents the engine rotational angle position. CPU 500 reads out the count of crank angle counter unit 503 and the latch value of timer unit 502. This read-out is carried out at two rotational angle positions, and the difference of the latch values is obtained. From the obtained difference, the time for the engine to rotate between these two rotational angle positions and the engine speed are measured.

Digital input port 504 receives starter signal SIG.(11) from starter 11. The voltage supplied to starter 11 via starter switch 111 is also supplied to digital input port 504 so that the ON state of starter switch 111 is acknowledged by digital input port 504. Digital input port 504 produces the program interruption signal which is supplied to interruption control unit 501.

Knock detection circuit 505 receives knock signal SIG.(6) and knock reference level SIG.(7) from filter 6 and half wave rectifier and integrator circuit 7 connected to knock sensor 4. Knock detection circuit 505 produces the knock detection pulse signal when the instantaneous value of the knock signal far exceeds the average value. CPU 500 commands the count of the number of these knock detection pulses during a predetermined period. Analog input port 507 receives air intake manifold pressure signal SIG.(3) from pressure sensor 3 and voltage signal SIG.(19) from battery 19 and carries out the analog-to-digital conversion of the received signals.

Current-flow and ignition control unit 508 supplies a current-flow and ignition signal to the actuator circuit of igniter 81. Unit 508 comprises a number of down-counters. It receives a command from CPU 500 regarding the selection of ignition coil 82 to be subjected to the current-flow and ignition control, the count of the crank angle counter from which the down counter should start counting, and the value of down count. Under this command, unit 508 makes the current-flow signal in the coil to be "0" in the case of current flow and "1" in the case of ignition, when the count of the down-counter reaches zero. Common bus 511 is connected to CPU 500. The control signals and data are transmitted between CPU 500 and the units of computer circuit 5 through common bus 511.

Knock sensor 4 monitors the oscillation of the engine block and produces the knock signal corresponding to the oscillation. The knock of engine 1 is detected by using the knock signal from filter 6 and the knock reference level signal from half wave rectifier and integrator circuit 7. The state of engine 1 is determined as the knock-state if knock rate V is greater than a predetermined value. Knock rate V is the ratio between knock signal SIG.(6) and reference level signal SIG.(7). That is V=SIG.(6)/SIG.(7). Reference level signal SIG.(7) is determined in accordance with such engine conditions as speed and intake air pressure and the state of the output signal of knock sensor 4.

Figure 3:
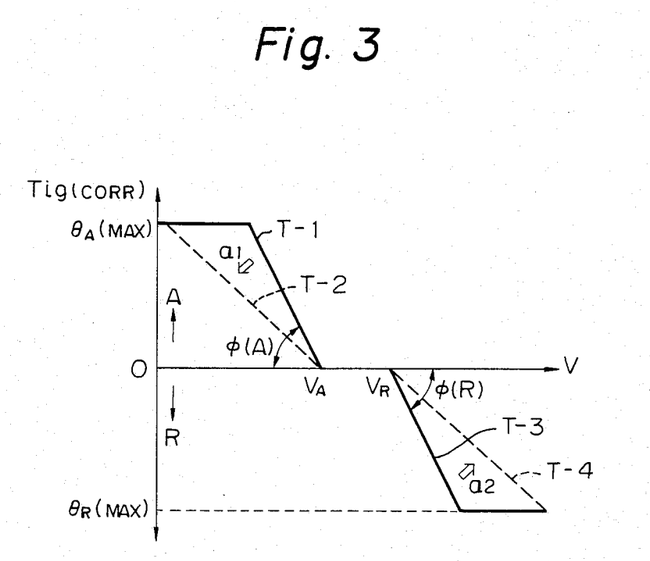
FIG. 3 illustrates the relationship between the amount of correction of the ignition timing and the knock rate.

The relationship between ignition timing correction amount $T_{ig}(CORR)$ and knock rate V is illustrated in the graph of FIG. 3. In the graph of FIG. 3, the abscissa represents knock rate V, while the ordinate represents ignition timing correction amount $T_{ig}(CORR)$. In the ordinate, "A" represents an advance in the ignition angle, "$\theta_A(MAX)$" represents the maximum value of the ignition timing correction amount in the advance side, "R" represents retardation in the ignition angle, and "$\theta_R(MAX)$" represents the maximum value of the ignition timing correction amount in the retardation side.

When knock rate V is less than predetermined value $V_A$, ignition timing correction amount $T_{ig}(CORR)$ increases in accordance with the reduction of V until $T_{ig}(CORR)$ reaches $\theta_A(MAX)$, as shown in solid T-1. When knock rate V is less than another predetermined value $V_R$, $T_{ig}(CORR)$ increases in accordance with the increase of V until $T_{ig}(CORR)$ reaches $\theta_R(MAX)$, as shown in solid line T-3.

In accordance with the present invention, it is proposed that the rate of increase $T_{ig}(CORR)$ in the range below $V_A$ or in the range above $V_R$ be reduced, as shown by arrow a1 or arrow a2, if the direction of correction of ignition timing of the present step is opposite to that of the preceding step. The reduction of the rate of increase of $T_{ig}(CORR)$ means the reduction of the gradient of line T-1, that is angle $\phi(A)$, or the gradient of line T-3, that is, angle $\phi(R)$.

This enables knock to be detected before the ignition timing correction amount far exceeds the optimum value to the advanced angle side and enables retardation of the angle to be carried out. This consequently allows knock to be eliminated and the ignition timing to return to the optimum value quickly.

Figure 5:
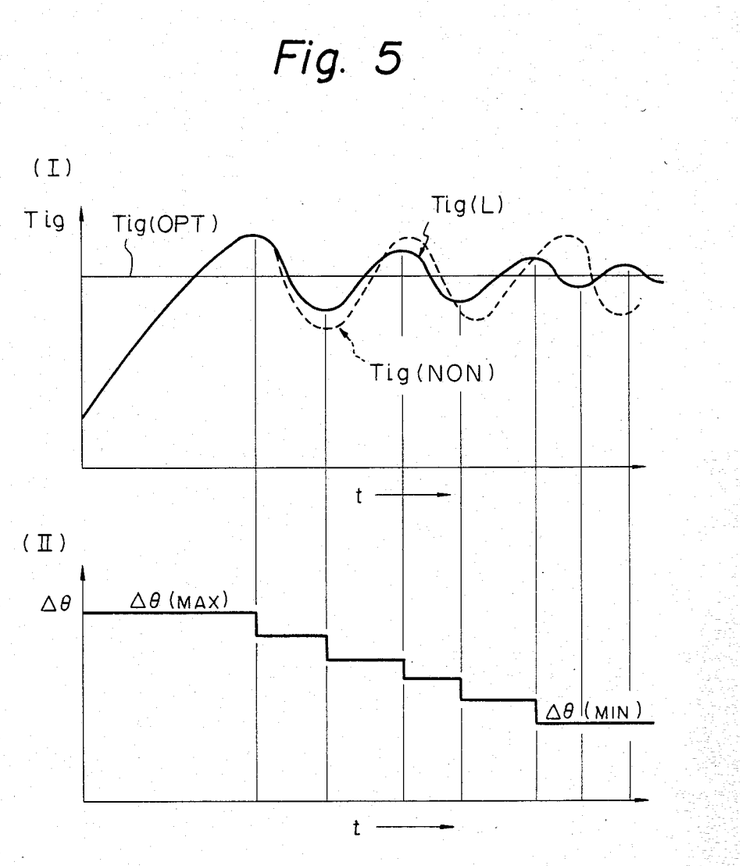
FIG. 5 illustrates the changes with time of the ignition timing and the correction angle.

The changes with time of ignition timing $T_{ig}$ and correction $\Delta\theta$ in accordance with the method of the present invention are illustrated in FIG. 5 (I) and (II), respectively. FIG. 5 (I) shows that the variation of value $T_{ig}$ is attenuated with the lapse of time, as indicated in waveform $T_{ig}(L)$. Waveform $T_{ig}(L)$ is obtained as the result of control with learning correction according to the present invention. The base level of the variation is optimum ignition timing $T_{ig}(OPT)$.

If no control with learning correction is carried out, the waveform becomes $T_{ig}(NON)$. The change with time of correction angle $\Delta\theta$ is illustrated in FIG. 5 (II).

Figures 4, 4A:
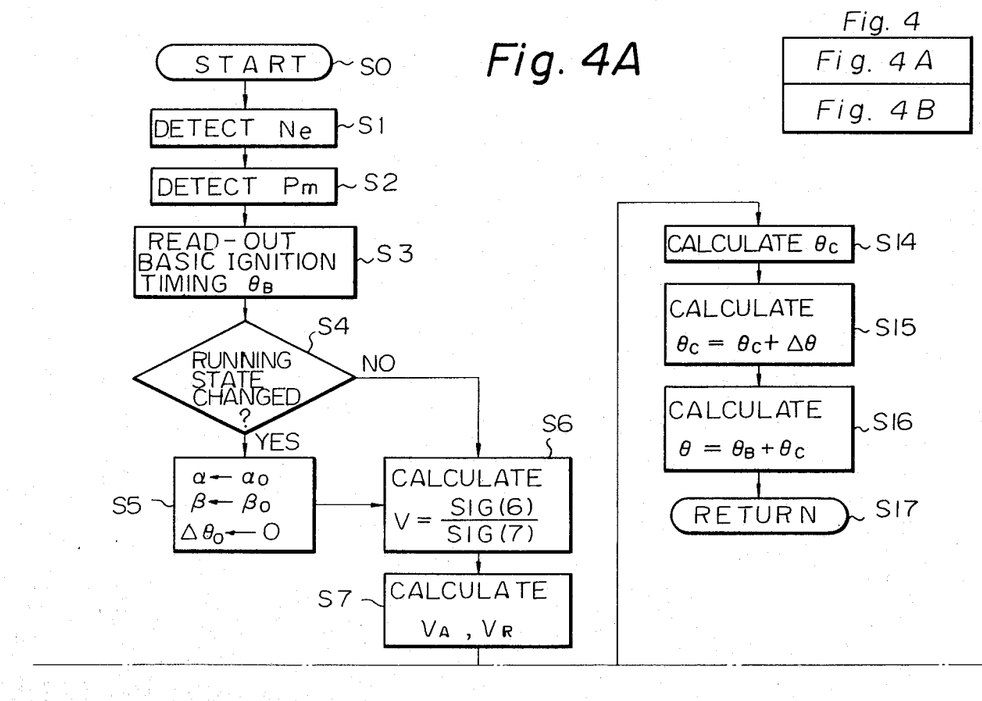
FIGS. 4, 4A and 4B illustrate a flow chart of the computation carried out in the computer of FIG. 2.
Figure 4B:
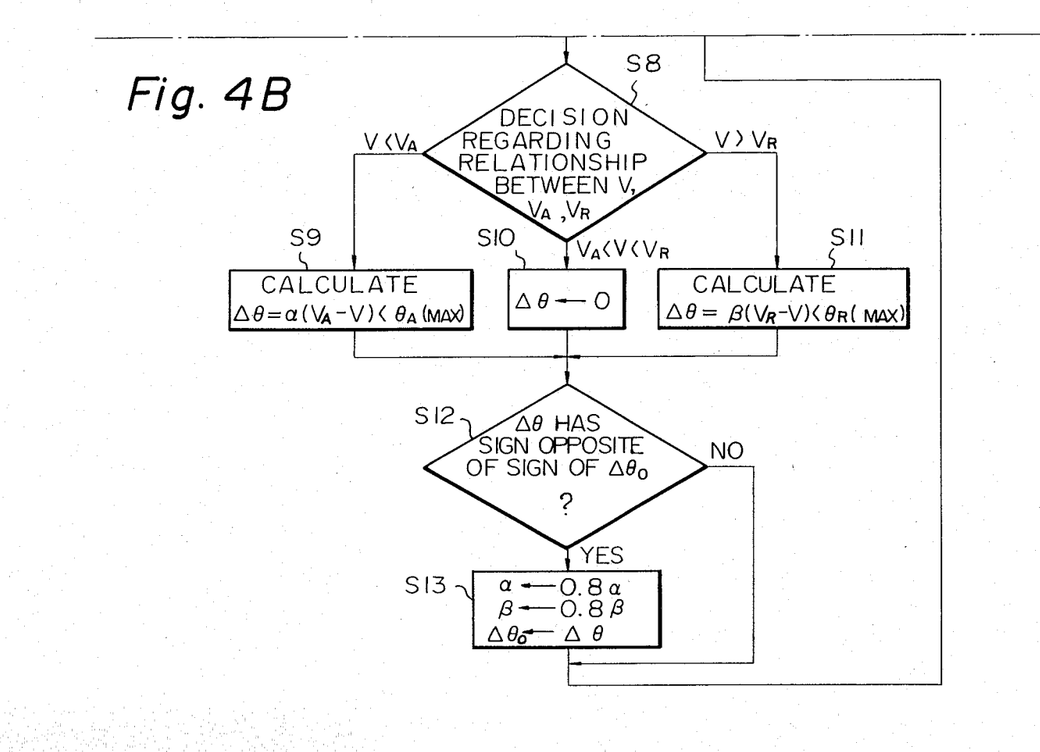

A flow chart of an example of the computation carried out in computer circuit 5 is illustrated in FIG. 4. In Step S1 and Step S2, engine speed $N_e$ and intake air pressure $P_m$ are detected. In Step S3, the basic ignition timing is read out from a two dimensional map of the engine speed and the intake air pressure stored in ROM 510.

In step S4, a decision is made as to whether or not engine running conditions have changed. If the decision is YES, constants $\alpha$ and $\beta$ assume the values $\alpha_0$ and $\beta_0$ and ignition timing correction amount $\Delta\theta_0$ assumes the value 0 in Step S5, and the process proceeds to Step S6. Constant $\alpha$ is the ratio between the ignition timing correction amount in the advance range and the knock rate. Constant $\beta$ is the ratio between the ignition timing correction amount in the retardation range and the knock rate. Values $\alpha_0$ and $\beta_0$ are the initial values of $\alpha$ and $\beta$, respectively. If the decision of Step S4 is NO, the process proceeds directly to Step S6.

In Step S6, knock rate V is calculated using the relationship "V=SIG.(6)/SIG.(7)".

In Step S7, critical values $V_A$ and $V_R$ of knock rate V are calculated. In Step S8, a decision regarding the relationship between V and $V_A$, $V_R$ is carried out. When the decision is $V<V_A$, the process proceeds to Step S9. When the decision is $V_A<V<V_R$, the process proceeds to Step S10. When the decision is $V>V_R$, the process proceeds to Step S11.

In Step S9, ignition angle correction amount $\Delta\theta$ is calculated as "$\Delta\theta=\alpha(V_A-V)$", where $\alpha$ is a constant. In this regard, $\Delta\theta$ should be less than $\theta_A(MAX)$. In Step S10, the ignition timing correction amount $\Delta\theta$ is selected as zero. In Step S11, the ignition timing correction amount is calculated as "$\Delta\theta=\beta(V_R-V)$", where $\beta$ is another constant. In this regard, $\Delta\theta$ should be less than $\theta_R(MAX)$.

In Step S12, the decision as to whether or not the present $\Delta\theta$ has the sign opposite of that of the preceding value $\Delta\theta_0$ is carried out. If the decision is YES, the process proceeds to Step S13. If the decision is NO, the process proceeds to Step S14. In Step S13, the value $\alpha$ and $\beta$ are reduced either by multiplying $\alpha$ and $\beta$ by a predetermined value less than 1, such as 0.8, or by subtracting a predetermined value from $\alpha$ and $\beta$. The $\Delta\theta$ obtained by the calculations $\Delta\theta=\alpha(V_A-V)$ and $\Delta\theta=\beta(V_R-V)$ is used as the new preceding value $\Delta\theta_0$.

In Step S14, the value $\theta_C$ of the corrected ignition timing is calculated in a similar manner as Step S3. In Step S15, the new value $\theta_C$ of the corrected ignition timing is calculated by adding the obtained $\Delta\theta$ to the value $\theta_C$ calculated in Step S14.

If engine running conditions change to a great extent, values $\alpha$ and $\beta$ are brought back to initial values $\alpha_0$ and $\beta_0$, and the process of the correction of ignition timing is started again.

Above, a preferred embodiment has been described. Various modifications and alterations of this embodiment are possible without departing from the scope of the present invention.

For example, although in the above-described embodiment the ignition timing correction amount is changed in accordance with the change of the knock rate, it is possible to use a single critical knock rate to carry out the angle correction in the retardation range by a predetermined amount when the knock rate is greater than the critical knock rate and carry out the correction of angle in the advance range by a predetermined rate. The reduction of the amount of correction corresponding to the change of correction direction is carried out similarly to the case of the above-described embodiment.

Figure 6:
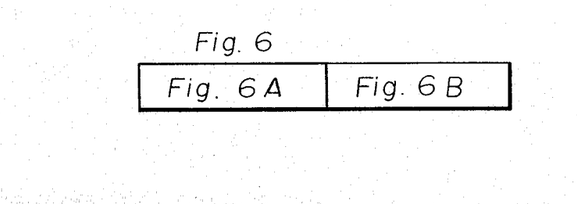
FIGS. 6, 6A and 6B illustrate a process in accordance with another embodiment of the present invention.
Figure 6A:
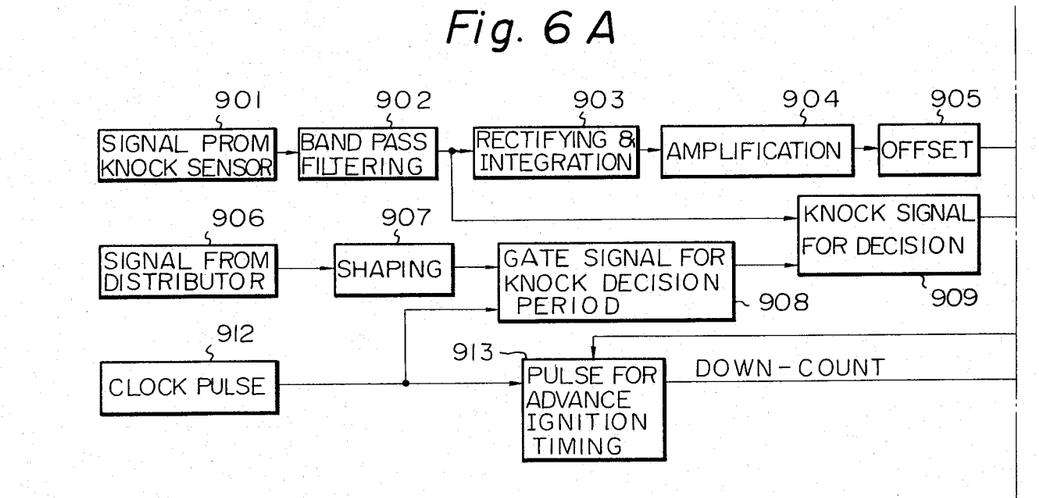
Figure 6B:
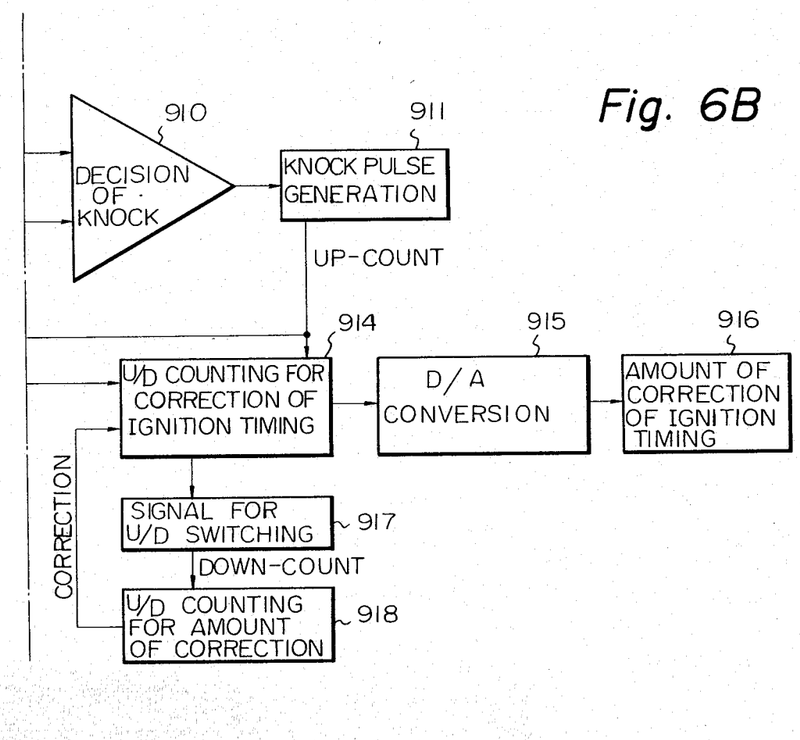

A process for controlling the ignition timing of internal combustion engines in accordance with another embodiment of the present invention is illustrated in FIG. 6.

In the process of FIG. 6, a sequence of steps comprising the signal from knock sensor 901, filtering by band pass filter 902, half-wave rectifying and integration 903, amplification 904, and implementation of offset 905 is used as an input of knock decision stage 910 to provide the criterion of the knock decision. The signal from distributor 906 is supplied to waveform shaping step 907. The signal of step 907 is supplied to step 908 for generating the gate signal for the knock decision period. Step 908 also receives clock pulse 912. The signal of step 902 and the signal of step 908 are supplied to step 909 for generating the knock signals which are to be supplied to step 910 for decision.

As the result of the decision in step 910, if the signal from step 909 is greater than the criterion from step 905, pulses called "knock pulses" are generated in step 911.

The knock pulses from step 911 are supplied to step 914 of the up/down counting for correction of the ignition timing as up-count pulses. In step 913, pulses for advance ignition timing are produced after a predetermined period after the generation of the knock pulse in step 911. The pulses of step 913 are supplied to step 914 as down-count pulses.

The signal of step 914 is supplied to step 917 for generating the signal for up/down switching. The signal of step 917 is supplied to step 918 for the correction amount up/down counting. The signal of step 918 is supplied to step 914 as the signal of the correction amount.

The signal of step 914 is supplied to digital/analog conversion step 915. The signal of step 915 is supplied to step 916 where the amount of the correction of the ignition timing is obtained.

Figure 7:
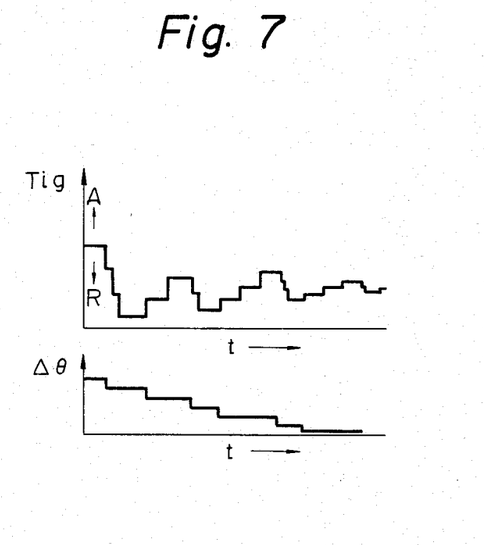
FIG. 7 illustrates the changes with time of the ignition timing and the correction amount in accordance with the process of FIG. 6.

It is arranged that one count of the correction amount signal from step 918 of the up/down counting for the correction amount corresponds to 0.10 of the crank angle. This count of the correction amount signal is supplied to step 914 to cause one down-counting each time the up/down switching occurs. Thus, amount $\Delta\theta$ of correction is reduced each time the up/down switching occurs. The change with time of ignition timing $T_{ig}$ and correction amount $\Delta\theta$ in accordance with the process of FIG. 6 is illustrated in FIG. 7.

We claim:

1. A method for controlling ignition timing for an internal combustion engine, comprising the steps of:
   detecting an engine running condition and generating a detection signal;
   deciding whether a change of the engine running condition takes place;
   determining, based on said detection signal and a correction factor, an amount of correction for correcting the ignition timing; and
   correcting the ignition timing in an advancing or retarding correction direction based on said determined correction amount,
   said amount of correction of the ignition timing being reduced with each change in the direction of correction of the ignition timing.

2. A method as defined in claim 1, wherein said correction amount determining step further includes a step of utilizing the relationship between a calculated knock rate and predetermined values to select the correction amount.

3. A method as defined in claim 1 or 2, wherein said correction amount determining step further includes a step of deciding whether a current amount of correction of ignition timing has a sign opposite of the sign of the preceding amount of correction of ignition timing to determine whether a sign change has occurred.

4. A method as defined in claim 3, wherein said correction amount determining step further includes a step of reducing correction factor constants which are used in the calculation of the amount of correction of ignition timing, if a sign change has occurred.

5. A method as defined in claim 4, wherein said correction amount determining step further comprises a step of restoring the reduced amount of correction calculation constants to a predetermined amount of correction of the ignition timing if said running condition changes.

6. A method as defined in claim 1, wherein said correction amount obtaining step includes a step of the decision of knock and a subsequent step of the generation of knock pulses, the generated knock pulses being used in a step of the generation of advance ignition timing pulses and a step of up/down counting for the correction of the ignition timing.

7. A method as defined in claim 6, wherein said correction amount obtaining step includes a step of the generation of signals for up/down switching, and a subsequent step of up/down counting for the amount of correction of the ignition timing, the determined amount of correction of the ignition timing being used in said step of up/down counting for correction of the ignition timing.

8. A method as defined in claim 6, wherein pulses generated by said step of the generation of advance ignition timing pulses are used in said step of up/down counting for the correction of the ignition timing.

9. A method as defined in claim 1, wherein said correction amount determining step includes the steps of:
   deciding whether a current amount of correction of ignition timing has a sign opposite of the sign of a preceding amount of correction of ignition timing to determine occurrence of a change of direction of correction between the preceding ignition and the current ignition, and reducing correction factor constants used in the calculation of the amount of correction of ignition timing whenever a correction sign change has occurred.

10. A method for controlling ignition timing for an internal combustion engine, comprising the steps of:

detecting engine running conditions and generating a detection signal;

determining an amount of correction based on such detection signal and a correction factor for correcting the ignition timing; and correcting the ignition timing in an advancing or retarding correction direction based on said determined correction amount, said amount of correction of the ignition timing also being reduced with passage of time.

11. Apparatus for controlling ignition timing of an internal combustion engine, comprising:

means for supplying signals representing engine running conditions;

knock detection means for detecting knock in said engine and supplying a signal representative thereof;

ignition means, responsive to signals, for providing ignition to said engine; and computer means for receiving the signals from said signal supplying means and said knock detection means, for calculating the ignition timing of the engine based on said received signals, and for delivering correction factor signals to said ignition means, said computer means furthermore deciding whether a current correction signal has a sign opposite of a sign of a preceding correction signal, and carrying out a reduction of the correction signal according to the result of said decision.

12. Apparatus for controlling ignition timing of an internal combustion engine, comprising;

means for supplying signals representing engine running conditions;

knock detection means for detecting knock in said engine and supplying a signal representative thereof;

ignition means, responsive to signals, for providing ignition to said engine; and computer means for receiving the signals from said signal supplying means and said knock detection means, for calculating the ignition timing of the engine based on said received signals, and for delivering correction factor signals to said ignition means, said computer means establishing a basic ignition timing in accordance with the engine running conditions, and calculating correction signals based on the signals from said knock detection means, said computer means further calculating a knock rate based on the signals from said knock detection means and a reference level, calculating the correction signals utilizing said calculated knock rate and a predetermined coefficient, deciding whether a current correction signal has a sign opposite of a sign of a preceding correction signal which is stored in a memory in said computer means, and reducing said predetermined coefficient when the result of said decision is affirmative.

* * * * *